(12) United States Patent
Sasaki et al.

(10) Patent No.: US 8,933,167 B2
(45) Date of Patent: Jan. 13, 2015

(54) POLYAMIDE AND POLYAMIDE COMPOSITION

(75) Inventors: Yukiyoshi Sasaki, Chiyoda-ku (JP); Hiroshi Oyamada, Chiyoda-ku (JP); Yasukazu Shikano, Chiyoda-ku (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 0 days.

(21) Appl. No.: 13/702,472

(22) PCT Filed: Jun. 10, 2011

(86) PCT No.: PCT/JP2011/063345
§ 371 (c)(1),
(2), (4) Date: Dec. 6, 2012

(87) PCT Pub. No.: WO2011/155596
PCT Pub. Date: Dec. 15, 2011

(65) Prior Publication Data
US 2013/0085229 A1    Apr. 4, 2013

(30) Foreign Application Priority Data

Jun. 11, 2010 (JP) ................... 2010-134472

(51) Int. Cl.
C08L 77/00 (2006.01)
C08G 69/26 (2006.01)
C08L 77/06 (2006.01)
C08K 7/14 (2006.01)
C08K 3/00 (2006.01)

(52) U.S. Cl.
CPC ............. C08G 69/265 (2013.01); C08L 77/06 (2013.01); C08K 7/14 (2013.01); C08K 3/0033 (2013.01)
USPC ............ 524/607; 528/196; 528/198; 528/199

(58) Field of Classification Search
None
See application file for complete search history.

(56) References Cited

U.S. PATENT DOCUMENTS

2002/0151625 A1* 10/2002 Yakabe et al. ................ 524/127
2009/0069499 A1   3/2009 Sarukawa

FOREIGN PATENT DOCUMENTS

| CN | 101405329 A | 4/2009 |
| EP | 0893464 A1 | 1/1999 |
| EP | 1323766 A1 | 7/2003 |
| EP | 2154201 A1 | 2/2010 |
| GB | 965815 A | 8/1964 |
| GB | 1254135 A | 11/1971 |
| GB | 2268182 A | 5/1994 |
| JP | 06-032976 | 2/1994 |
| JP | 06-032980 | 2/1994 |
| JP | 07-118522 | 5/1995 |
| JP | 2000-191771 | 7/2000 |
| JP | 2000-219808 | 8/2000 |
| JP | 2002-105312 | 4/2002 |
| JP | 2002-275372 A | 9/2002 |
| JP | 2003-165838 | 6/2003 |
| JP | 2005-162821 A | 6/2005 |
| JP | 2005-263828 A | 9/2005 |
| JP | 2010-248402 | 11/2010 |
| JP | 2010-248403 | 11/2010 |

OTHER PUBLICATIONS

Search report from International Application No. PCT/JP2011/063345.
International Preliminary Report on Patentability and Written Opinion of the Searching Authority for International Application No. PCT/JP2011/063345.
Chinese Office Action issued with respect to Chinese Application No. 201180028556.6, mail date is Jan. 8, 2014.
European Search Report issued with respect to application No. 11792553.7, mail date is Oct. 30, 2014.

* cited by examiner

*Primary Examiner* — Susannah Chung
*Assistant Examiner* — Robert T Butcher
(74) *Attorney, Agent, or Firm* — Greenblum & Bernstein, P.L.C.

(57) ABSTRACT

A polyamide comprising (a) a unit comprising adipic acid and hexamethylenediamine and (b) a unit comprising isophthalic acid and hexamethylenediamine, wherein a ratio of the isophthalic acid component to the total carboxylic acid component in the polyamide is $0.05 \leq (x) \leq 0.5$ and a range of blocking ratio (Y) is $-0.3 \leq (Y) \leq 0.8$. Also provided are compositions comprising 30 to 95% by mass of the above polyamide and 5 to 70% by mass of an inorganic filler.

4 Claims, 1 Drawing Sheet

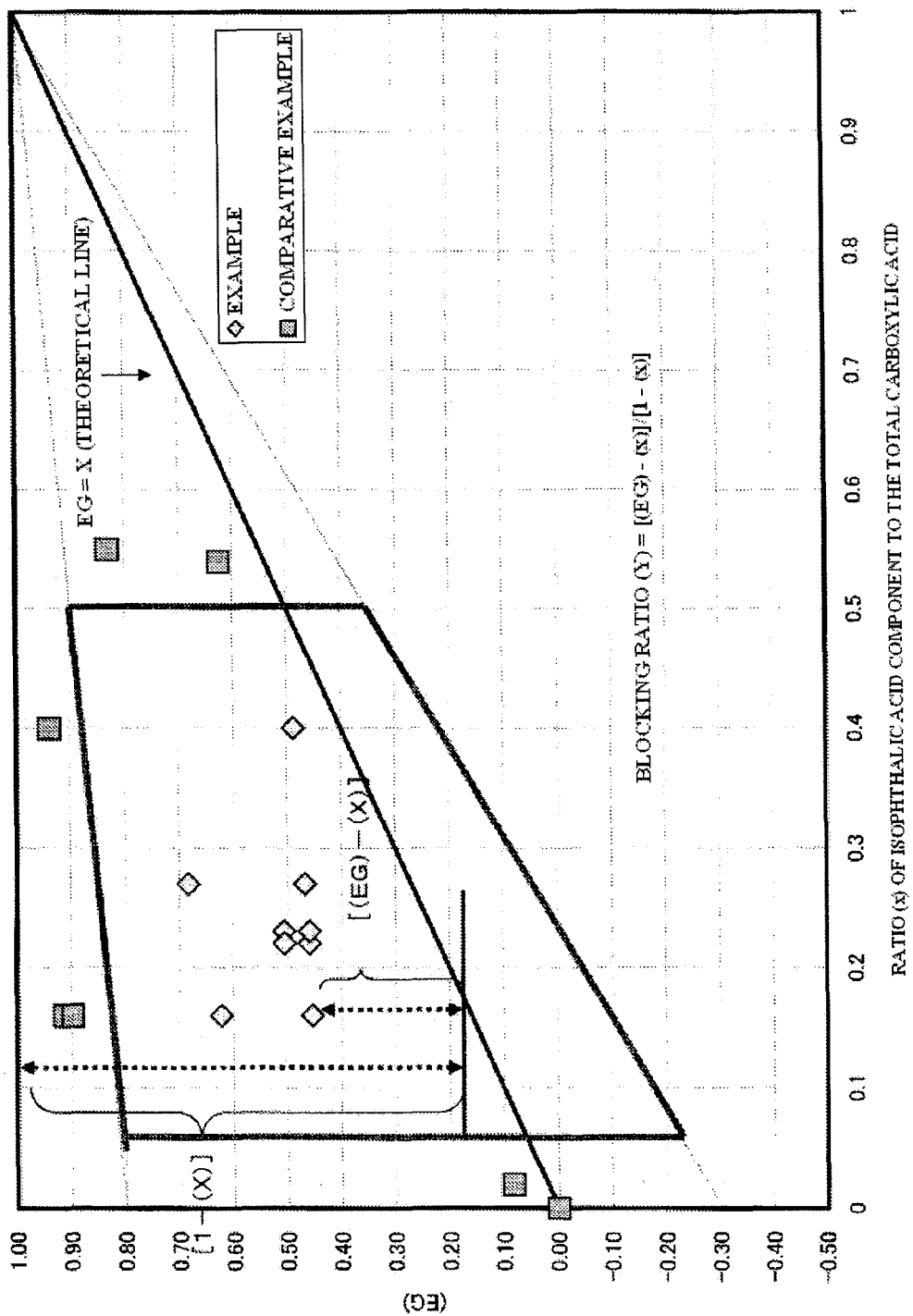

POLYAMIDE AND POLYAMIDE COMPOSITION

TECHNICAL FIELD

The present invention relates to a polyamide and a polyamide composition.

BACKGROUND ART

Polyamide resins have good fabricability, mechanical properties and chemical resistance and thus have been widely used as various part materials for garments, industrial materials, automobile, electric and electronic, industrial products, and the like.

Recently, molded articles using a polyamide resin have sometimes been molded under high cycle molding conditions at a high molding temperature and a reduced mold temperature to enhance the productivity.

Also, polyamide resins are widely used in the automobile field, and for such applications, the usage environment is thermally and mechanically rigorous, and currently many cases often require both impact properties and surface appearance properties to automobile exterior parts, in particular, represented by fender mirrors.

On the other hand, when the molding is carried out under a high temperature condition, failure to provide a molded article stably sometimes occurs as a problem because of the degradation of polyamide resins and the occurrence of change in the fluidity.

For this reason, there is a demand for a polyamide resin which has improved surface appearance stability of a molded product and even impact resistance properties when subjected to the high cycle molding as described above and causes little physical property changes under intense molding conditions.

To meet such a demand, a polyamide composed of Polyamide 66/6I to which an isophthalic acid component is introduced is disclosed as a material capable of enhancing the surface appearance and mechanical properties of a molded product (see, for example, Patent Documents 1 to 4). Also, a polyamide composed of Polyamide 6T/6I to which a terephthalic acid component and an isophthalic acid component are introduced is disclosed as a material capable of improving impact resistance properties (see, for example, Patent Document 5).

CITATION LIST

Patent Document

Patent Document 1: Japanese Patent Laid-Open No. 6-32976
Patent Document 2: Japanese Patent Laid-Open No. 6-32980
Patent Document 3: Japanese Patent Laid-Open No. 7-118522
Patent Document 4: Japanese Patent Laid-Open No. 2000-219808
Patent Document 5: Japanese Patent Laid-Open No. 2000-191771

SUMMARY OF INVENTION

Problems to be Solved by Invention

However, the polyamides produced using the techniques disclosed in the above Patent Documents 1 to 4 pose problems in that the surface appearance of a molded product is impaired and the stability is reduced under the intense molding conditions such as the high cycle molding conditions, unlike the surface appearance of a molded product which is improved under the usual molding conditions, because the 6I unit in Polyamide 66/6I is block copolymerized at a high ratio in the polyamide chain.

Further, the polyamides produced using the techniques disclosed in Patent Documents 1 to 4 raise the problem of reducing the impact resistance properties due to the polymer structure because, as described above, the 6I chain unit in Polyamide 66/6I is block copolymerized at a high ratio in the polyamide chain.

Furthermore, the polyamide produced using the production technique disclosed in the above Patent Document 5 has the problem of impairing molded surface appearance despite improved impact resistance properties.

As described above, in Polyamide 66/6I obtained using the conventional art, the 6I chain unit in Polyamide 66/6I is block copolymerized at a higher ratio than an ideal random copolymer, and thus it is difficult to maintain the mechanical properties balance, maintain the stability of surface appearance of a molded product and enhance the impact resistance properties; and the fact is that a polyamide, which has good surface appearance stability of a molded product and impact resistance properties and causes little physical property changes when molded under intense molding conditions, is yet to be found.

Further, it is difficult to maintain the surface appearance stability of a molded product while maintaining the balance of mechanical properties distinctive to the polyamide, and thus such a polyamide is demanded.

Thus, a main object of the present invention, in view of the above circumstances, is to provide a polyamide capable of rendering good surface appearance stability to a molded article and outstanding impact resistance properties even when molded under rigorous molding conditions.

Means for Solving Problems

The present inventors have conducted extensive studies to solve the above problems distinctive to Polyamide 66/6I and have found that the above problems can be solved, in (A) a polyamide comprising (a) a unit comprising adipic acid and hexamethylenediamine and (b) a unit comprising isophthalic acid and hexamethylenediamine, by specifying a range of a ratio (x) of an isophthalic acid component to a total carboxylic acid component in the polyamide and specifying a numerical value range of the value (Y) $\{(Y)=[(EG)-(x)]/[1-(x)]\}$, which is the blocking index of the 6I chain unit in Polyamide 66/6I when (EG)=an amount of isophthalic acid end group/the total amount of carboxyl end group, whereby the present invention has been accomplished.

More specifically, the present invention is as follows.

[1]
(A) a polyamide comprising:
  (a) a unit comprising adipic acid and hexamethylenediamine and
  (b) a unit comprising isophthalic acid and hexamethylenediamine,
wherein a ratio (x) of an isophthalic acid component to a total carboxylic acid component in the polyamide is $0.05 \leq (x) \leq 0.5$ and
a range of (Y) represented by the following formula (1) is $-0.3 \leq (Y) \leq 0.8$.

$$(Y)=[(EG)-(x)]/[1-(x)] \tag{1}$$

wherein (EG) is a ratio of an isophthalic acid end group to a total carboxyl end group contained in the polyamide and represented by the following formula (2).

$$(EG)=\text{an amount of the isophthalic acid end group/the total amount of the carboxyl end group} \quad (2)$$

[2]
The polyamide according to [1], wherein the range of (Y) represented by the formula (1) is $0.05 \le (Y) \le 0.8$.

[3]
The polyamide according to [1] or [2], wherein the ratio (x) of the isophthalic acid component, the amount of isophthalic acid end group, and the total amount of carboxyl end group are values determined by a nuclear magnetic resonance method (NMR).

[4]
A polyamide composition comprising:
30 to 95% by mass of the polyamide according to any one of [1] to [3]; and
5 to 70% by mass of (B) an inorganic filler.

Advantageous Effects of Invention

According to the present invention, a polyamide molded article with stabilized surface appearance and good impact resistance properties is provided even when molded under rigorous molding conditions.

BRIEF DESCRIPTION OF THE DRAWING

FIG. 1 illustrates a chart showing the relation between the blocking ratio (Y) and the ratio (x) of isophthalic acid component to the total carboxylic acid component in the polyamide.

MODE FOR CARRYING OUT INVENTION

Hereinbelow, the embodiments to carry out the present invention (hereinafter referred to as "present embodiment") are described in detail.

The present invention is not limited to the following embodiments, and can be carried out in various modifications within the spirit and scope of the invention.

[Polyamide]
The polyamide of the present embodiment comprises:
(a) a unit comprising adipic acid and hexamethylenediamine; and
(b) a unit comprising isophthalic acid and hexamethylenediamine.

The ratio (x) of the isophthalic acid component to the total carboxylic acid component in the polyamide is $0.05 \le (x) \le 0.5$, preferably $0.05 \le (x) \le 0.4$, further preferably $0.05 \le (x) \le 0.3$.

The ratio (x) of the isophthalic acid component to the total carboxylic acid component in the polyamide refers to a ratio of (b) the unit comprising isophthalic acid and hexamethylenediamine contained in the polyamide.

When the ratio (x) of the isophthalic acid component is 0.05 or more, the melting point and solidification temperature of the polyamide is controlled and the surface appearance of a molded article is stabilized. On the other hand, when the ratio (x) of the isophthalic acid component is 0.5 or less, the reduction of polyamide crystallinity is controlled and a molded article attains sufficient mechanical strength.

The polyamide of the present embodiment has a range of (Y) represented by the following formula (1) being $-0.3 \le (Y) \le 0.8$.

$$(Y)=[(EG)-(x)]/[1-(x)] \quad (1)$$

In the formula (1), (x) represents a ratio of the isophthalic acid component to the total carboxylic acid component in the polyamide and refers to the ratio of (b) the unit comprising isophthalic acid and hexamethylenediamine contained in the polyamide.

(EG) represents a ratio of the isophthalic acid end group to the total carboxyl end group and is represented by the following formula (2).

$$(EG)=\text{an amount of the isophthalic acid end group/the total amount of the carboxyl end group} \quad (2)$$

In the above formula (1), (Y) represents an index showing an amount of selective presence of the isophthalic acid end group in the total carboxyl end group (hereinafter also referred to as "blocking ratio (Y)").

The ratio (x) of the isophthalic acid component to the total carboxylic acid component in the polyamide and the ratio (EG) of the isophthalic acid end group to the total carboxyl end group contained in the polyamide are correlated, in other words, the blocking ratio (Y) also represents an index showing the amount of the blocked 6I unit chain in Polyamide 66/6I with respect to the theoretical value (X=EG).

Accordingly, the denominator [1−(x)] of the above formula (1) represents a ratio of the end groups other than the isophthalic acid end group in the total carboxylic acid component in the polyamide, and the numerator [(EG)−(x)] of the above formula (1) thus represents an ratio of the isophthalic acid end group, which is the difference between the theoretical ratio of the isophthalic acid end group (=ratio of the isophthalic acid component), whereby the (Y), the index of the blocking ratio, can be determined by the above formula (1).

FIG. 1 illustrates a chart showing the relation between the blocking ratio (Y) and the ratio (x) of the isophthalic acid component to the total carboxylic acid component in the polyamide based on the present Examples to be described later.

The blocking ratio (Y) is within a range of $-0.3 \le (Y) \le 0.8$, preferably $0.05 \le (Y) \le 0.8$, more preferably $0.05 \le (Y) \le 0.7$, further preferably $0.1 \le (Y) \le 0.6$.

When the ratio (x) of the isophthalic acid component is within the above range and the (Y) is within the range of $-0.3 \le (Y) \le 0.8$, good surface appearance stability and impact resistance properties are rendered to a molded article under rigorous molding conditions.

A method for measuring the ratio (x) of the isophthalic acid component, the amount of isophthalic acid end group and the total amount of carboxyl end group in the polyamide of the present embodiment is not limited but can be determined by a nuclear magnetic resonance method (NMR).

More specifically, they can be determined by $^1$H-NMR.

(Copolymerization Components Other than Adipic Acid and Isophthalic Acid)

The polyamide of the present embodiment may use, as a copolymerization component, within the range in which the object of the present embodiment is not adversely affected, aliphatic dicarboxylic acid, alicyclic dicarboxylic acid and aromatic dicarboxylic acid other than adipic acid and isophthalic acid; and diamine having a substituent branched out from the main chain other than hexamethylenediamine, aliphatic diamine, aromatic diamine, polycondensable amino acid, lactam, and the like.

Examples of the aliphatic dicarboxylic acid include linear or branched saturated aliphatic dicarboxylic acids having 3 to 20 carbon atoms such as malonic acid, dimethylmalonic acid, succinic acid, 2,2-dimethylsuccinic acid, 2,3-dimethylglutaric acid, 2,2-diethylsuccinic acid, 2,3-diethylglutaric acid, glutaric acid, 2,2-dimethylglutaric acid, 2-methyladipic acid, trimethyladipic acid, pimelic acid, suberic acid, azelaic acid, sebacic acid, dodecanedioic acid, tetradecanedioic acid, hexadecanedioic acid, octadecanedioic acid, eicosane diacid, and diglycolic acid.

Examples of the alicyclic dicarboxylic acid include alicyclic dicarboxylic acids having preferably 3 to 10 carbon atoms, preferably 5 to 10 carbon atoms in the alicyclic structure such as 1,3-cyclohexanedicarboxylic acid and 1,3-cyclopentanedicarboxylic acid.

The alicyclic dicarboxylic acid may or may not be substituted.

Examples of the aromatic dicarboxylic acid include aromatic dicarboxylic acids having 8 to 20 carbon atoms which are unsubstituted or substituted with various substituents such as terephthalic acid, naphthalene dicarboxylic acid, 2-chloroterephthalic acid, 2-methylterephthalic acid, 5-methylisophthalic acid, and 5-sodium sulfoisophthalate.

Examples of the various substituents include an alkyl group having 1 to 6 carbon atoms, an aryl group having 6 to 12 carbon atoms, an arylalkyl group having 7 to 20 carbon atoms, a halogen group such as a chloro group or a bromo group, an alkyl silyl group having 3 to 10 carbon atoms, and a sulfone group and groups as salts thereof such as sodium salt.

Examples of the diamine having a substituent branched out from the main chain other than hexamethylenediamine include branched saturated aliphatic diamines having 3 to 20 carbon atoms such as 2-methyl pentamethylene diamine (also referred to as 2-methyl-1,5-diaminopentane), 2,2,4-trimethylhexamethylene diamine, 2,4,4-trimethylhexamethylene diamine, 2-methyl octamethylene diamine, and 2,4-dimethyloctamethylene diamine.

Examples of the aliphatic diamine include linear saturated aliphatic diamines having 2 to 20 carbon atoms such as ethylenediamine, propylenediamine, tetramethylene diamine, pentamethylene diamine, heptamethylene diamine, octamethylene diamine, nonamethylene diamine, decamethylene diamine, undecamethylene diamine, dodecamethylene diamine, and tridecamethylene diamine.

Examples of the aromatic diamine include methaxylene diamine.

Examples of the polycondensable amino acid include 6-aminocaproic acid, 11-aminoundecanoic acid, 12-aminododecanoic acid, and para amino methyl benzoic acid.

Examples of the lactam include butyllactam, pivalolactam, caprolactam, capryllactam, enantholactam, undecanolactam, and dodecanolactam.

The dicarboxylic acid components, diamine components, amino acid components and lactam components described above may be used singly or two or more may be used in combination.

(End Capping Agent)

To adjust the molecular weight and enhance hot water resistance, an end capping agent may further be added as a raw material to the polyamide of the present embodiment and polyamide copolymers in which other copolymerization components are polymerized therewith.

For example, when polymerizing the polyamide of the present invention or the polyamide copolymer described above, the polymerization amount can be controlled by adding a known end capping agent.

The end capping agent is not limited to and examples thereof include acid anhydrides such as monocarboxylic acid, monoamine, and phthalic anhydride, monoisocyanate, monoacid halide, monoesters, and monoalcohols.

Of these, monocarboxylic acid and monoamine are preferable.

These end capping agents may be used singly or two or more may be used in combination.

The monocarboxylic acid used as the end capping agent is not limited insofar as it reacts to an amino group, and examples of the monocarboxylic acid include aliphatic monocarboxylic acids such as acetic acid, propionic acid, butyric acid, valeric acid, caproic acid, caprylic acid, lauric acid, tridecyl acid, myristic acid, palmitic acid, stearic acid, pivalic acid, and isobutyric acid; alicyclic monocarboxylic acids such as cyclohexanecarboxylic acid; aromatic monocarboxylic acids such as benzoic acid, toluic acid, α-naphthalene carboxylic acid, β-naphthalene carboxylic acid, methylnaphthalene carboxylic acid, and phenylacetic acid.

These monocarboxylic acids may be used singly or two or more may be used in combination.

The monoamine used as the end capping agent is not limited insofar as it reacts to a carboxyl group, and examples of the monoamine include aliphatic monoamines such as methylamine, ethylamine, propylamine, butylamine, hexylamine, octylamine, decylamine, stearylamine, dimethylamine, diethylamine, dipropylamine, and dibutylamine; alicyclic monoamines such as cyclohexylamine and dicyclohexylamine; aromatic monoamines such as aniline, toluidine, diphenylamine, and naphthylamine.

These monoamines may be used singly or two or more may be used in combination.

[Method for Producing Polyamide or Polyamide Copolymer]

The method for producing the polyamide of the present embodiment or the polyamide copolymers having other copolymerization components described above is not limited and may be any method insofar as a polyamide (or a polyamide copolymer), which has a range of (Y), a blocking ratio index in the above formula (1), being $-0.3 \leq (Y) \leq 0.8$, preferably $0.05 \leq (Y) \leq 0.8$, can be obtained.

For example, a method in which an aqueous solution or a suspension containing a mixture of adipic acid, isophthalic acid, hexamethylenediamine and as necessary other components is heated and polymerized while maintaining a fused state (thermofusion polymerization method); a method in which a polymerization degree of a polyamide obtained by the thermofusion polymerization method is increased while maintaining the solid state at a temperature lower than the melting point (thermofusion polymerization/solid state polymerization method); a method in which an aqueous solution or a suspension containing a mixture of adipic acid, isophthalic acid, hexamethylenediamine and as necessary other components is heated and the prepolymer precipitated is fused again using an extruder such as a kneader to raise a polymerization degree (prepolymer/extrusion polymerization method); a method in which a mixture, a solid salt or a polycondensate of adipic acid, isophthalic acid, hexamethylenediamine and as necessary other components is polymerized while maintaining the solid state (solid state polymerization method); and the like.

The polymerization mode is not limited and may be either the batch mode or the continuous mode.

The polymerization apparatus is not limited and known apparatuses such as an autoclave reactor, a tumbler reactor, and an extrusion reactor such as a kneader can be used.

Among the production methods described above, the thermofusion polymerization method is preferable in light of the productivity. An example is a batch thermofusion polymerization method.

An example of the batch thermofusion polymerization method is described below.

The polymerization temperature condition is not limited but preferably 100° C. or higher, more preferably 120° C. or higher, further preferably 170° C. or higher.

For example, a mixture, a solid salt or an aqueous solution of adipic acid, isophthalic acid and hexamethylenediamine is stirred at a temperature of 110 to 200° C. and concentrated with heating while steam is gradually reduced to about 60 to 90%.

Subsequently, the heating is continued until the internal pressure reaches about 1.5 to 5.0 MPa (gauge pressure).

Then, the pressure is maintained at about 1.5 to 5.0 MPa (gauge pressure) while removing water and/or gas components, the pressure is gradually reduced as water and/or gas components are removed at the time the internal temperature reaches preferably 240° C. or higher, more preferably 245° C. or higher, and polycondensation is carried out at a normal pressure or a reduced pressure so that the final internal temperature is preferably 250° C. or higher, more preferably 260° C. or higher which is the thermofusion polymerization method employable.

Further, the solid state polymerization method, in which a mixture, a solid salt or a polycondensate of adipic acid, isophthalic acid and hexamethylenediamine is thermally polycondensed at a temperature lower than the melting point, can also be employed. These methods may be used in combination as necessary.

When an extrusion reactor such as a kneader is used, an extrusion condition has a reduced pressure degree of preferably about 0 to 0.07 MPa.

The extrusion temperature is preferably a temperature about 1 to about 100° C. higher than the melting point determined by the differential scanning calorimetry (DSC) measurement in accordance with JIS-K7121.

The shear rate is preferably about 100 (sec$^{-1}$) or more, and the average retention time is preferably about 0.1 to 15 minutes.

When the above extrusion conditions are met, the occurrence of problems of failing to color and achieving a high molecular weight can be effectively controlled.

For the production of the polyamide (including polyamide copolymers, the same shall apply hereinafter), it is preferred that a predetermined catalyst be used.

The catalyst is not limited insofar as it is a known catalyst used in polyamides and examples of the catalyst include phosphoric acid, phosphorous acid, hypophosphorous acid, orthophosphorous acid, pyrophosphorous acid, phenylphosphinic acid, phenylphosphonic acid, 2-methoxypheny phosphonic acid, 2-(2'-pyridyl) ethylphosphonic acid, and metal salts thereof.

Examples of the metal of metal salts include metal salts and ammonium salts such as potassium, sodium, magnesium, vanadium, calcium, zinc, cobalt, manganese, tin, tungsten, germanium, titanium, and antimony.

Also usable include phosphoric acid esters such as ethyl ester, isopropyl ester, butyl ester, hexyl ester, decyl ester, isodecyl ester, octadecyl ester, stearyl ester, and phenyl ester.

[Physical Properties of the Polyamide or Polyamide Copolymer]

The polyamide of the present embodiment has a formic acid solution viscosity (JIS K 6816) of preferably 10 to 30.

When a formic acid solution viscosity is 10 or higher, a molded article having practically sufficient mechanical properties is obtained, whereas when a formic acid solution viscosity is 30 or less, the fluidity at the time of molding is desirable, providing a molded article with good surface appearance.

[Polyamide Composition]

The polyamide composition of the present embodiment contains 30 to 95% by mass of the above polyamide (A) and 5 to 70% by mass of (B) an inorganic filler.

(Inorganic Filler)

(B) The inorganic filler is not limited to and examples thereof include glass fibers, carbon fibers, wollastonite, talc, mica, kaolin, barium sulfate, calcium carbonate, apatite, sodium phosphate, fluorite, silicon nitride, potassium titanate, and molybdenum disulfide.

Among these, in light of physical properties, safety and economic efficiency, glass fibers, carbon fibers, wollastonite, talc, mica, kaolin, boron nitride, potassium titanate and apatite are preferably used.

The glass fibers and carbon fibers are not limited and any form of glass fibers and carbon fibers such as long filament type, short filament type and atypical section type can be used.

Among the above glass fibers and carbon fibers, in light of exhibiting high properties, those having a number average fiber diameter of preferably 3 to 30 μm, a weight average fiber length of preferably 100 to 750 μm and an aspect ratio (L/D) of a weight average fiber length to an average fiber diameter of preferably 10 to 100.

In particular, those having a number average fiber diameter of 3 to 30μm, a weight average fiber length of 100 to 750 μm and an aspect ratio (L/D) of a weight average fiber length to an average fiber diameter of 10 to 100 are preferable.

A preferable wollastonite, in light of exhibiting high properties, has a number average fiber diameter of preferably 3 to 30 μm, a weight average fiber length of preferably 10 to 500 μm and the aspect ratio (L/D) described above of preferably 3 to 100.

In particular, those having a number average fiber diameter (D) of 3 to 30 μm, a weight average fiber length (L) of 10 to 500 μm and an aspect ratio (L/D) of 3 to 100 are more preferable.

For talc, mica, kaolin, silicon nitride and potassium titanate described above, in light of exhibiting high properties, those having a number average fiber diameter of 0.1 to 3 μm are preferable.

The number average fiber diameter and the weight average fiber diameter of (B) the inorganic filler can be measured by a microscope method.

For example, a polyamide resin composition containing a pellet glass fiber is heated at a temperature higher than the decomposition temperature of the polyamide resin composition, the residual glass fiber is photographed using a microscope and measured by a method for measuring the glass fiber diameter.

Examples of the method for calculating the number average fiber diameter and the weight average fiber diameter using the measured value obtained by the microscope method include the following formulae (I) and (II).

Number average fiber diameter=total glass fiber length/number of glass fiber (I)

Weight average fiber diameter=square sum of glass fiber length/total glass fiber length (II)

(B) The inorganic filler is preferably surface treated in light of enhancing the mechanical strength.

The surface treatment is not limited to and examples thereof include the use of a coupling agent or a film forming agent.

The coupling agent is not limited to and examples thereof include silane-based coupling agents and titanium-based coupling agents.

The silane-based coupling agent is not limited to and examples thereof include triethoxysilane, vinyl tris (β-methoxyethoxy) silane, γ-methacryloxypropyl trimethoxysilane, γ-glycidoxypropyl trimethoxysilane, β-(1,1-epoxycyclohexyl) ethyl trimethoxysilane, N-β-(aminoethyl)-γ-aminopropyl methyl dimethoxysilane, γ-aminopropyl triethoxysilane, N-phenyl-γ-aminopropyl trimethoxysilane, γ-mercaptopropyl trimethoxysilane, γ-chloropropyl trimethoxysilane, γ-aminopropyl trimethoxysilane, γ-aminopropyl-tris (2-methoxy-ethoxy) silane, N-methyl-γ-aminopropyl trimethoxysilane, N-vinyl benzyl-γ-aminopropyl triethoxysilane, triaminopropyl trimethoxysilane, 3-ureidopropyl trimethoxysilane, 3-hydroimidazole propyl triethoxysilane, hexamethyl disilazane, N,O-(bistrimethyl silyl) amide, N,N-bis (trimethyl silyl) urea et al.

Of these, amino silane and epoxy silane such as γ-aminopropyl trimethoxysilane, N-β-(aminoethyl)-γ-aminopropyl trimethoxysilane, γ-glycidoxypropyl trimethoxysilane, β-(1,1-epoxycyclohexyl) ethyl trimethoxysilane et al are preferably used because of good economic efficiency and easy handleability.

The titanium-based coupling agent is not limited to and examples thereof include isopropyl triisostearoyl titanate, isopropyl tridodecyl benzene sulfonyl titanate, isopropyl tris (dioctylpyrophosphate) titanate, tetraisopropyl bis (dioctyl phosphite) titanate, tetraoctyl bis (ditridecyl phosphite) titanate, tetra (1,1-diallyl oxymethyl-1-butyl) bis (ditridecyl) phosphite titanate, bis (dioctylpyrophosphate) oxyacetate titanate, bis (dioctylpyrophosphate) ethylene titanate, isopropyl trioctanoyl titanate, isopropyl dimethacrylisostearoyl titanate, isopropyl isostearoyl diacryltitanate, isopropyl tri (dioctyl phosphate) titanate isopropyl tricumyl phenyl titanate, isopropyl tri (N-amide ethyl, aminoethyl) titanate, dicumyl phenyl oxyacetate titanate, diisostearoyl ethylene titanate et al.

The film forming agent is not limited to and examples thereof include copolymers of a urethane polymer, an acrylic acid polymer or an anhydrous maleic acid with a unsaturated monomer such as ethylene, styrene, α-methyl styrene, butadiene, isoprene, chloroprene, 2,3-dichlorobutadiene, or 1,3-pentadiene, cyclooctadiene; and polymers such as epoxy polymers, polyester polymers, vinyl acetate polymers, and polyether polymers.

Among these, in light of good economic efficiency and performance, urethane polymers, acrylic acid polymers, butadiene anhydrous maleic acid copolymer, ethylene anhydrous malic acid copolymer, styrene anhydrous maleic acid copolymer and mixtures thereof are preferable.

The method for carrying out the surface treatment of (B) an inorganic filler using the coupling agent or film forming agent described above is not limited and a known method can be employed.

Examples thereof include a sizing treatment in which an organic solvent solution or a suspension of the above coupling agent or film forming agent is applied to the surface as a so-called sizing agent; dry blending in which the solution or suspension is applied using a Henschel mixer, a super mixer, a ready mixer, a V shape blender or the like; a spray method in which the solution or suspension is applied by spraying; an integral blend method; and a dry concentrate method.

Moreover, further examples thereof include combination methods of these methods (e.g., a method in which a coupling agent and a part of a film forming agent are applied by the sizing treatment and the remaining film forming agent is sprayed, etc.).

Among these methods, the sizing treatment, the dry blending, the spray method, and combination methods thereof are preferable in light of good economic efficiency.

A content proportion of (B) the inorganic filler in the polyamide composition according to the present embodiment is 5 to 70% by mass, preferably 5 to 60% by mass, more preferably 10 to 60% by mass.

When the content proportion of the inorganic filler is adjusted within the above range, good mechanical properties can be achieved and the inclination affecting extrusion properties and moldability can be controlled.

These inorganic fillers may be used singly or two or more may be used in combination.

(Degradation Inhibitor)

The polyamide and the polyamide composition of the present embodiment may contain a degradation inhibitor as necessary for the purpose of enhancing thermal degradation, resistance to tarnish when heated, heat-resistant aging and weather resistance within the range in which the object of the present embodiment is not adversely affected.

The degradation inhibitor is not limited to and examples thereof include copper compounds such as copper acetate and copper iodide, phenol-based stabilizers such as hindered phenol compounds, phosphite-based stabilizers, hindered amine-based stabilizers, triazine-based stabilizers, and sulfur-based stabilizers.

These degradation inhibitors may be used singly or two or more may be used in combination.

(Moldability Improving Agent)

The polyamide and the polyamide composition of the present embodiment may contain a moldability improving agent as necessary within the range in which the object of the present embodiment is not adversely affected.

The moldability improving agent is not limited to and examples thereof include higher fatty acids, higher fatty acid metal salts, higher fatty acid esters, and higher fatty acid amides.

Examples of the higher fatty acid include saturated or unsaturated linear or branched aliphatic monocarboxylic acids having 8 to 40 carbon atoms such as stearic acid, palmitic acid, behenic acid, erucic acid, oleic acid, lauric acid, and montanic acid.

Of these, stearic acid and montanic acid are preferable.

The higher fatty acid metal salt refers to metal salts of the higher fatty acids.

Preferable metallic elements of the metal salt are Groups 1, 2, and 3 elements of the periodic table of the elements, zinc and aluminum, and the like, and more preferable are Groups 1 and 2 elements such as calcium, sodium, potassium, and magnesium, aluminum, and the like.

Examples of the higher fatty acid metal salt include calcium stearate, aluminum stearate, zinc stearate, magnesium stearate, calcium montanate, sodium montanate, and calcium palmitate.

Of these, the metal salt of montanate and the metal salt of stearate are preferable.

The higher fatty acid ester refers to an esterified product of the above higher fatty acid and an alcohol.

Esters of an aliphatic carboxylic acid having 8 to 40 carbon atoms and an aliphatic alcohol having 8 to 40 carbon atoms are preferable.

Examples of the aliphatic alcohol include stearyl alcohol, behenyl alcohol, and lauryl alcohol.

Examples of the higher fatty acid ester include stearyl stearate, and behenyl behenate.

The higher fatty acid amide is an amide compound of the higher fatty acid' described above.

Examples of the higher fatty acid amide include octadecanamide, oleamide, erucamide, ethylenebis (stearylamide), ethylene bisoleylamide, N-stearylstearylamide, and N-stearylerucamide.

Preferable higher fatty acid amides are octadecanamide, erucamide, ethylenebis (stearylamide) and N-stearylerucamide, more preferable are ethylenebis (stearylamide) and N-stearylerucamide.

These higher fatty acids, higher fatty acid metal salts, higher fatty acid esters and higher fatty acid amides may be used singly or two or more may be used in combination.

(Coloring Agent)

The polyamide and the polyamide composition of the present embodiment may contain a coloring agent as necessary within the range in which the object of the present embodiment is not adversely affected.

The coloring agent is not limited to and examples thereof include dyes such as nigrosine, pigments such as titanium oxide and carbon black, particles of metals such as aluminum, colored aluminum, nickel, tin, copper, gold, silver, platinum, iron oxide, stainless steel, and titanium, and metallic pigments such as mica pearl pigment, colored graphite, colored glass fiber, and colored glass flake.

(Other Resins)

The polyamide and the polyamide composition of the present embodiment may contain other resins as necessary within the range in which the object of the present embodiment is not adversely affected.

Such a resin is not limited to and examples thereof include thermoplastic resins and rubber components to be described later.

Examples of the thermoplastic resin include polystyrene-based reins such as atactic polystyrene, isotactic polystyrene, syndiotactic polystyrene, AS resin, and ABS resin; polyester-based resins such as polyethylene terephthalate and polybutylene terephthalate; other polyamides (polyamides other than the polyamide of the present embodiment) such as nylon 6, 66, and 612; polyether-based resins such as polycarbonate, polyphenylene ether, polysulfone, and polyether sulfone; condensation-based resins such as polyphenylene sulfide and polyoxymethylene; acrylic-based resins such as polyacrylic acid, polyacrylic acid ester, and polymethyl methacrylate; polyolefin-based resins such as polyethylene, polypropylene, polybutene, and ethylene-propylene copolymers; halogen-containing vinyl compound-based resins such as polyvinyl chloride and polyvinylidene chloride; phenol resins; and epoxy resins.

These thermoplastic resins may be used singly or two or more may be used in combination.

Examples of the rubber component include natural rubber, polybutadiene, polyisoprene, polyisobutylene, neoprene, polysulfide rubber, Thiokol rubber, acrylic rubber, urethane rubber, silicone rubber, epichlorohydrin rubber, styrene-butadiene block copolymer (SBR), hydrogenated styrene-butadiene block copolymer (SEB), styrene-butadiene-styrene block copolymer (SBS), hydrogenated styrene-butadiene-styrene block copolymer (SEBS), styrene-isoprene block copolymer (SIR), hydrogenated styrene-isoprene block copolymer (SEP), styrene-isoprene-styrene block copolymer (SIS), hydrogenated styrene-isoprene-styrene block copolymer (SEPS), styrene-butadiene random copolymer, hydrogenated styrene-butadiene random copolymer, styrene-ethylene-propylene random copolymer, styrene-ethylene-butylene random copolymer, ethylene-propylene copolymer (EPR), ethylene-(1-butene) copolymer, ethylene-(1-hexene) copolymer, ethylene-(1-octene) copolymer, ethylene-propylene-diene copolymer (EPDM); and core shell type rubbers including, butadiene-acrylonitrile-styrene-core-shell rubber (ABS), methyl methacrylate-butadiene-styrene-core-shell rubber (MBS), methyl methacrylate-butyl acrylate-styrene-core-shell rubber (MAS), octyl acrylate-butadiene-styrene-core-shell rubber (MABS), alkyl acrylate-butadiene-acrylonitrile-styrene-core-shell rubber (AABS), butadiene-styrene-core-shell rubber (SBR) and siloxane-containing core shell rubbers such as methyl methacrylate-butyl acrylate siloxane, to name a few.

These rubber components may be used singly or two or more may be used in combination.

[Method for Producing the Polyamide Composition]

The polyamide composition of the present embodiment can be produced by adding, to the polyamide, the inorganic filler described above and, as necessary, the degradation inhibitor, the moldability improving agent, the coloring agent and other resins.

A known extrusion technique can be used for the method of adding.

For example, the melt kneading temperature is preferably about 250 to 350° C. in terms of resin temperature. The melt kneading time is preferably about 1 to 30 minutes.

For the method for feeding components composing a reinforced polyamide into a melt kneader, all components may be fed into the same supply inlet at the same time or the components may be fed respectively from different supply inlets.

More specifically, the method for mixing includes a method in which the polyamide and the inorganic filler are mixed using a Henschel mixer or the like and fed and kneaded in a melt kneader, a method in which the inorganic filler is admixed from a side feeder to the polyamide fused using a single screw extruder or biaxial extruder equipped with a pressure reducer.

[Molded Article]

A method for producing a molded article by molding the polyamide of the present embodiment or the polyamide composition of the present embodiment is not limited and a known molding method can be employed.

Examples of the molding method include extrusion, injection molding, vacuum forming, blow molding, injection compression molding, decorative molding, different material molding, gas-assisted injection molding, foam injection molding, low pressure molding, ultrathin injection molding (ultra-high-speed injection molding), and in-mold composite molding (insert molding and outsert molding).

[Purpose of Use]

The polyamide molded article of the present embodiment and the polyamide composition molded article of the present embodiment have good molded article surface appearance stability and impact resistance properties under rigorous molding conditions and can be used for a wide variety of purposes.

For example, such a molded article can be favorably used in the automobile field, electric/electronic field, machinery/industrial field, office equipment field and aerospace field.

EXAMPLE

Hereinafter, the present invention is specifically described with reference to Examples and Comparative Examples, but is not limited thereto.

First, composing components of the polyamide, methods for measuring the physical properties and methods for evaluating properties are described below.

[Measurement Method]

<Measurement of Ratio of Isophthalic Acid Component, Isophthalic Acid End Group and Total Carboxyl End Group in the Polyamide>

The measurements were carried out by $^1$H-NMR using the polyamide or a molded article.

Bisulfate was used as a solvent.

The apparatus used was JEOL Ltd. "ECA400 model".

The measurement was carried out in a repeating time of 12 sec. and the number of integration of 64.

The ratio of the isophthalic acid component, isophthalic acid end group and other carboxyl end groups (e.g., adipic acid end group) were calculated based on the integrated value of a property signal of each component.

<Formic Acid Solution Viscosity>

The polyamide was dissolved in a formic acid solution and the viscosity was measured in accordance with JIS K6810.

<Evaluation of Appearance Stability>

The apparatus used was a NISSEI PLASTIC INDUSTRIAL CO., LTD. "FN3000".

With a cylinder temperature set at 320° C. and a mold temperature set at 70° C., the molding was carried out up to 100 shots using the polyamide or the polyamide composition under the injection molding conditions of an injecting time of 17 sec. and a cooling time of 20 sec. to obtain ISO test pieces.

The appearance stability of the obtained molded articles (ISO test pieces) was determined by measuring the gloss value using a Horiba Ltd. Handheld Gloss Checker "IG320" and following the method below.

Appearance stability=(average gloss value of 20 to 30 shots ISO test pieces)−(average gloss value of 90 to 100 shots ISO test pieces)

It was judged that the smaller the above value difference was, the better appearance stability was.

<Measurement of Impact Resistance Property Charpy Impact Strength>

The Charpy impact strength was measured in accordance with ISO 179 using 20 to 25 shots ISO test pieces obtained in the above appearance stability test.

The measurement value was the average value of n=6.

The material below was used as (B) the inorganic filler used for the production of the polyamide composition to be described later.

[(B) Inorganic Filler]

Glass fiber (b1) Chongqiung Polycomp International Corporation, tradename: ECS301HP, average fiber diameter: 10 μm, cut length: 3 mm The polyamide, polyamide composition and molded articles were produced and measured and evaluated by the methods described above.

EXAMPLE 1

1237 g of an equimolar salt of adipic acid and hexamethylenediamine, 263 g of an equimolar salt of isophthalic acid and hexamethylenediamine and 0.5% by mol excess of adipic acid with respect to the total equimolar salt component were dissolved in 1500 g of distilled water to prepare an equimolar 50% by mass homogeneous aqueous solution of the raw material monomers.

This aqueous solution was charged into an autoclave having an internal volume of 5.4 L, and the autoclave was then subjected to nitrogen substitution.

While the aqueous solution was stirred at a temperature of from 110 to 150° C., water vapor was gradually removed to concentrate the solution to a concentration of 70% by mass.

Subsequently, the internal temperature of the autoclave was increased to 220° C.

At this time, the pressure in the autoclave was increased to 1.8 MPa.

The aqueous solution was heated for 1 hour without further treatment until the internal temperature of the autoclave reached 245° C. and the reaction was allowed to proceed for 1 hour while water vapor was gradually removed to maintain the pressure at 1.8 MPa.

Then, the internal pressure of autoclave was reduced to 1 MPa over 1 hour, and the inside of the autoclave was maintained under a reduced pressure of 650 torr using a vacuumer for 10 minutes.

At this time, the final internal temperature of polymerization was 265° C.

Thereafter, the pressure inside the autoclave was increased with nitrogen, the obtained polymer was extruded from a lower spinning port (nozzle) in a strand state, cooled with water, cut into the pellet form and dried at 100° C. for 12 hours under a nitrogen atmosphere to obtain a polyamide.

The polymer properties of the obtained polyamide such as the ratio (x) of the isophthalic acid component, the ratio (EG) of the isophthalic acid end group, and formic acid solution viscosity were measured by the methods described above. Table 1 below shows the measurement results.

Further, using the obtained polyamide, a molded article was produced by the method described above and evaluated for the appearance stability and impact resistance properties. Table 1 below shows the evaluation results.

In Tables 1 and 2, the abbreviation "66/6I" showing the type of polyamide represents the polyamide containing the unit composed of adipic acid and hexamethylenediamine (66) and the unit composed of isophthalic acid and hexamethylenediamine (6I). Similarly, the abbreviation "66" showing the type of polyamide represents the polyamide containing the unit composed of adipic acid and hexamethylenediamine (66).

EXAMPLE 2

1132 g of an equimolar salt of adipic acid and hexamethylenediamine and 368 g of an equimolar salt of isophthalic acid and hexamethylenediamine were used.

Other conditions were carried out in the same manner as in Example 1, whereby a polyamide was obtained.

The polymer properties of the obtained polyamide such as the ratio (x) of the isophthalic acid component, the ratio (EG) of the isophthalic acid end group, and formic acid solution viscosity were measured by the methods described above. The measurement results are shown in Table 1 below.

Further, using the obtained polyamide, a molded article was produced by the method described above and evaluated for the appearance stability and impact resistance properties. Table 1 below shows the evaluation results.

EXAMPLE 3

1044 g of an equimolar salt of adipic acid and hexamethylenediamine and 456 g of an equimolar salt of isophthalic acid and hexamethylenediamine were used.

Other conditions were carried out in the same manner as in Example 1, whereby a polyamide was obtained.

The polymer properties of the obtained polyamide such as the ratio (x) of the isophthalic acid component, the ratio (EG)

of the isophthalic acid end group, and formic acid solution viscosity were measured by the methods described above. The measurement results are shown in Table 1 below.

Further, using the obtained polyamide, a molded article was produced by the method described above and evaluated for the appearance stability and impact resistance properties. Table 1 below shows the evaluation results.

EXAMPLE 4

816 g of an equimolar salt of adipic acid and hexamethylenediamine and 684 g of an equimolar salt of isophthalic acid and hexamethylenediamine were used.

Other conditions were carried out in the same manner as in Example 1, whereby a polyamide was obtained.

The polymer properties of the obtained polyamide such as the ratio (x) of the isophthalic acid component, the ratio (EG) of the isophthalic acid end group, and formic acid solution viscosity were measured by the methods described above. The measurement results are shown in Table 1 below.

Further, using the obtained polyamide, a molded article was produced by the method described above and evaluated for the appearance stability and impact resistance properties. Table 1 below shows the evaluation results.

EXAMPLE 5

1237 g of an equimolar salt of adipic acid and hexamethylenediamine and 263 g of an equimolar salt of isophthalic acid and hexamethylenediamine were used. 0.5% by mol excess of adipic acid with respect to the total equimolar salt component was not added.

Other conditions were carried out by the method of Example 1, whereby a polyamide was obtained.

The polymer properties of the obtained polyamide such as the ratio (x) of the isophthalic acid component, the ratio (EG) of the isophthalic acid end group, and formic acid solution viscosity were measured by the methods described above. The measurement results are shown in Table 1 below.

Further, using the obtained polyamide, a molded article was produced by the method described above and evaluated for the appearance stability and impact resistance properties. Table 1 below shows the evaluation results.

EXAMPLE 6

1044 g of an equimolar salt of adipic acid and hexamethylenediamine and 456 g of an equimolar salt of isophthalic acid and hexamethylenediamine were used. 0.5% by mol excess of adipic acid with respect to the total equimolar salt component was not added.

Other conditions were carried out by the method of Example 1, whereby a polyamide was obtained.

The polymer properties of the obtained polyamide such as the ratio (x) of the isophthalic acid component, the ratio (EG) of the isophthalic acid end group, and formic acid solution viscosity were measured by the methods described above. The measurement results are shown in Table 1 below.

Further, using the obtained polyamide, a molded article was produced by the method described above and evaluated for the appearance stability and impact resistance properties. Table 1 below shows the evaluation results.

EXAMPLE 7

1114 g of an equimolar salt of adipic acid and hexamethylenediamine, 386 g of an equimolar salt of isophthalic acid and hexamethylenediamine and 0.5% by mol excess of adipic acid with respect to the total equimolar salt component were dissolved in 1500 g of distilled water to prepare an equimolar 50% by mass homogeneous aqueous solution of the raw material monomers.

This aqueous solution was charged into an autoclave having an internal volume of 5.4 L, and the autoclave was then subjected to nitrogen substitution.

While the aqueous solution was stirred at a temperature of from 110 to 150° C., water vapor was gradually removed to concentrate the solution to a concentration of 70% by mass.

Subsequently, the internal temperature of the autoclave was increased to 220° C.

At this time, the pressure in the autoclave was increased to 1.8 MPa.

The internal temperature of the autoclave was increased to 245° C. over 1 hour without further treatment and the reaction was allowed to proceed for 1 hour while water vapor was gradually removed to maintain the pressure at 1.8 MPa.

Then, the internal pressure of autoclave was reduced to 1 MPa over 1 hour, and the inside of the autoclave was maintained under a reduced pressure of 400 torr using a vacuumer for 10 minutes.

At this time, the final internal temperature of polymerization was 265° C.

Thereafter, the pressure inside the autoclave was increased with nitrogen, the obtained polymer was extruded from a lower spinning port (nozzle) in a strand state, cooled with water, cut into the pellet form and dried at 100° C. for 12 hours under a nitrogen atmosphere to obtain a polyamide.

The polymer properties of the obtained polyamide such as the ratio (x) of the isophthalic acid component, the ratio (EG) of the isophthalic acid end group, and formic acid solution viscosity were measured by the methods described above. The measurement results are shown in Table 1 below.

Further, using the obtained polyamide, a molded article was produced by the method described above and evaluated for the appearance stability and impact resistance properties. Table 1 below shows the evaluation results.

EXAMPLE 8

1114 g of an equimolar salt of adipic acid and hexamethylenediamine, 368 g of an equimolar salt of isophthalic acid and hexamethylenediamine and 0.5% by mol excess of adipic acid with respect to the total equimolar salt component were dissolved in 1500 g of distilled water to prepare an equimolar 50% by mass homogeneous aqueous solution of the raw material monomers.

This aqueous solution was charged into an autoclave having an internal volume of 5.4 L, and the autoclave was then subjected to nitrogen substitution.

While the aqueous solution was stirred at a temperature of from 110 to 150° C., water vapor was gradually removed to concentrate the solution to a concentration of 70% by mass.

Subsequently, the internal temperature of the autoclave was increased to 220° C.

At this time, the pressure in the autoclave was increased to 1.8 MPa.

The internal temperature of the autoclave was increased to 245° C. over 1 hour without further treatment and the reaction was allowed to proceed for 1 hour while water vapor was gradually removed to maintain the pressure at 1.8 MPa.

Then, the internal pressure of autoclave was reduced to 1 MPa over 1 hour, and the inside of the autoclave was maintained under a reduced pressure of 650 torr using a vacuumer for 20 minutes.

At this time, the final internal temperature of polymerization was 270° C.

Thereafter, the pressure inside the autoclave was increased with nitrogen, the obtained polymer was extruded from a lower spinning port (nozzle) in a strand state, cooled with water, cut into the pellet form and dried at 100° C. for 12 hours under a nitrogen atmosphere to obtain a polyamide.

The polymer properties of the obtained polyamide such as the ratio (x) of the isophthalic acid component, the ratio (EG) of the isophthalic acid end group, and formic acid solution viscosity were measured by the methods described above. The measurement results are shown in Table 1 below.

Further, using the obtained polyamide, a molded article was produced by the method described above and evaluated for the appearance stability and impact resistance properties. Table 1 below shows the evaluation results.

EXAMPLE 9

1109 g of an equimolar salt of adipic acid and hexamethylenediamine, 368 g of an equimolar salt of isophthalic acid and hexamethylenediamine, 5 g of ccaprolactam and 0.5% by mol excess of adipic acid with respect to the total equimolar salt component were dissolved in 1500 g of distilled water to prepare an equimolar 50% by mass homogeneous aqueous solution of the raw material monomers.

This aqueous solution was charged into an autoclave having an internal volume of 5.4 L, and the autoclave was then subjected to nitrogen substitution.

While the aqueous solution was stirred at a temperature of from 110 to 150° C., water vapor was gradually removed to concentrate the solution to a concentration of 70% by mass.

Subsequently, the internal temperature of the autoclave was increased to 220° C.

At this time, the pressure in the autoclave was increased to 1.8 MPa.

The internal temperature of the autoclave was increased to 245° C. over 1 hour without further treatment and the reaction was allowed to proceed for 1 hour while water vapor was gradually removed to maintain the pressure at 1.8 MPa.

Then, the internal pressure of autoclave was reduced to 1 MPa over 1 hour, and the inside of the autoclave was maintained under a reduced pressure of 650 torr using a vacuumer for 10 minutes.

At this time, the final internal temperature of polymerization was 265° C.

Thereafter, the pressure inside the autoclave was increased with nitrogen, the obtained polymer was extruded from a lower spinning port (nozzle) in a strand state, cooled with water, cut into the pellet form and dried at 100° C. for 12 hours under a nitrogen atmosphere to obtain a polyamide.

The polymer properties of the obtained polyamide such as the ratio (x) of the isophthalic acid component, the ratio (EG) of the isophthalic acid end group, and formic acid solution viscosity were measured by the methods described above. The measurement results are shown in Table 1.

Further, using the obtained polyamide, a molded article was produced by the method described above and evaluated for the appearance stability and impact resistance properties. Table 1 below shows the evaluation results.

EXAMPLE 10

The polyamide obtained in the above [Example 1] was supplied to a TEM35 mm biaxial extruder (set temperature: 290° C., screw rotation 300 rpm), a product of TOSHIBA MACHINE CO., LTD., using a feed hopper.

Further, glass fiber (b1) as (B) the inorganic filler was supplied from a side feeder in a ratio of 33% by mass with respect of 67% by mass of the polyamide and the melt kneading was carried out. The melt-kneaded product extruded from a spinning port was cooled in a strand state and pelletized to obtain a pellet polyamide composition.

Further, using the obtained polyamide composition, a molded article was produced by the method described above and evaluated for the appearance stability and impact resistance properties. Table 1 below shows the evaluation results.

EXAMPLE 11

The polyamide obtained in the above [Example 1] was supplied to a TEM35 mm biaxial extruder (set temperature: 290° C., screw rotation 300 rpm), a product of TOSHIBA MACHINE CO., LTD., using a feed hopper.

Further, glass fiber (b1) as (B) the inorganic filler was supplied from a side feeder in a ratio of 50% by mass with respect of 50% by mass of the polyamide and the melt kneading was carried out. The melt-kneaded product extruded from a spinning port was cooled in a strand state and pelletized to obtain a pellet polyamide composition.

Further, using the obtained polyamide composition, a molded article was produced by the method described above and evaluated for the appearance stability and impact resistance properties. Table 1 below shows the evaluation results.

COMPARATIVE EXAMPLE 1

1500 g of an equimolar salt of adipic acid and hexamethylenediamine and 0.5% by mol excess of adipic acid with respect to the total equimolar salt component were dissolved in 1500 g of distilled water to prepare an equimolar 50% by mass homogeneous aqueous solution of the raw material monomers.

This aqueous solution was charged into an autoclave having an internal volume of 5.4 L, and the autoclave was then subjected to nitrogen substitution.

While the aqueous solution was stirred at a temperature of from 110 to 150° C., water vapor was gradually removed to concentrate the solution to a concentration of 70% by mass.

Subsequently, the internal temperature of the autoclave was increased to 220° C.

At this time, the pressure in the autoclave was increased to 1.8 MPa.

The internal temperature of the autoclave was increased to 260° C. over 1 hour without further treatment and the reaction was allowed to proceed for 1 hour while water vapor was gradually removed to maintain the pressure at 1.8 MPa.

Then, the internal pressure of autoclave was reduced to 1 MPa over 1 hour, and the inside of the autoclave was maintained under a reduced pressure of 650 torr using a vacuumer for 10 minutes.

At this time, the final internal temperature of polymerization was 290° C.

Thereafter, the pressure inside the autoclave was increased with nitrogen, the obtained polymer was extruded from a lower spinning port (nozzle) in a strand state, cooled with water, cut into the pellet form and dried at 100° C. for 12 hours under a nitrogen atmosphere to obtain a polyamide.

The polymer properties of the obtained polyamide such as the ratio (x) of the isophthalic acid component, the ratio (EG) of the isophthalic acid end group, and formic acid solution viscosity were measured by the methods described above. The measurement results are shown in Table 2.

Further, using the obtained polyamide, a molded article was produced by the method described above and evaluated for the appearance stability and impact resistance properties. Table 2 below shows the evaluation results.

COMPARATIVE EXAMPLE 2

1455 g of an equimolar salt of adipic acid and hexamethylenediamine and 45 g of an equimolar salt of isophthalic acid and hexamethylenediamine were used.

Other conditions were carried out in the same manner as in Comparative Example 1, whereby a polyamide was obtained.

The polymer properties of the obtained polyamide such as the ratio (x) of the isophthalic acid component, the ratio (EG) of the isophthalic acid end group, and formic acid solution viscosity were measured by the methods described above. The measurement results are shown in Table 2 below.

Further, using the obtained polyamide, a molded article was produced by the method described above and evaluated for the appearance stability and impact resistance properties. Table 2 below shows the evaluation results.

COMPARATIVE EXAMPLE 3

1237 g of an equimolar salt of adipic acid and hexamethylenediamine, 263 g of an equimolar salt of isophthalic acid and hexamethylenediamine and 0.5% by mol excess of adipic acid with respect to the total equimolar salt component were dissolved in 1500 g of distilled water to prepare an equimolar 50% by mass homogeneous aqueous solution of the raw material monomers.

This aqueous solution was charged into an autoclave having an internal volume of 5.4 L, and the autoclave was then subjected to nitrogen substitution.

While the aqueous solution was stirred at a temperature of from 110 to 150° C., water vapor was gradually removed to concentrate the solution to a concentration of 70% by mass.

Then, the internal temperature of the autoclave was increased to 220° C.

At this time, the pressure in the autoclave was increased to 1.8 MPa.

The internal temperature of the autoclave was increased to 260° C. over 1 hour without further treatment and the reaction was allowed to proceed for 1 hour while water vapor was gradually removed to maintain the pressure at 1.8 MPa.

Subsequently, the valve was closed, the heat was turned off and the internal temperature of the autoclave was cooled to room temperature over about 8 hours to obtain a polyamide having a formic acid solution viscosity of 7.

The obtained polyamide was ground and charged into an evaporator having an internal volume of 10 L and subjected to solid polymerization at 200° C. for 10 hours under a nitrogen gas stream.

The polymer properties of the obtained polyamide such as the ratio (x) of the isophthalic acid component, the ratio (EG) of the isophthalic acid end group, and formic acid solution viscosity were measured by the methods described above. The measurement results are shown in Table 2 below.

Further, using the obtained polyamide, a molded article was produced by the method described above and evaluated for the appearance stability and impact resistance properties. Table 2 below shows the evaluation results.

COMPARATIVE EXAMPLE 4

816 g of an equimolar salt of adipic acid and hexamethylenediamine and 684 g of an equimolar salt of isophthalic acid and hexamethylenediamine were used.

Other conditions were carried out in the same manner as in Comparative Example 3, whereby a polyamide was obtained.

The polymer properties of the obtained polyamide such as the ratio (x) of the isophthalic acid component, the ratio (EG) of the isophthalic acid end group, and formic acid solution viscosity were measured by the methods described above. The measurement results are shown in Table 2 below.

Further, using the obtained polyamide, a molded article was produced by the method described above and evaluated for the appearance stability and impact resistance properties. Table 2 below shows the evaluation results.

COMPARATIVE EXAMPLE 5

1220 g of an equimolar salt of adipic acid and hexamethylenediamine, 280 g of an equimolar salt of isophthalic acid and hexamethylenediamine and 0.5% by mol excess of adipic acid with respect to the total equimolar salt component were dissolved in 1500 g of distilled water to prepare an equimolar 50% by mass homogeneous aqueous solution of the raw material monomers.

This aqueous solution was charged into an autoclave having an internal volume of 5.4 L, and the autoclave was then subjected to nitrogen substitution.

While the aqueous solution was stirred at a temperature of from 110 to 150° C., water vapor was gradually removed to concentrate the solution to a concentration of 70% by mass.

Subsequently, the internal temperature of the autoclave was increased to 220° C.

At this time, the pressure in the autoclave was increased to 1.8 MPa.

The internal temperature of the autoclave was increased to 260° C. over 2 hours without further treatment and the reaction was allowed to proceed for 1 hour while water vapor was gradually removed to maintain the pressure at 1.8 MPa.

Then, the pressure inside the autoclave was reduced to 1 MPa over 1 hour, then the valve was closed, the heat was turned off and the internal temperature of the autoclave was cooled to room temperature over about 8 hours to obtain a polyamide. The obtained polyamide was ground and dried at 100° C. for 12 hours under a nitrogen atmosphere to obtain the polyamide.

The polymer properties of the obtained polyamide such as the ratio (x) of the isophthalic acid component, the ratio (EG) of the isophthalic acid end group, and formic acid solution viscosity were measured by the methods described above. The measurement results are shown in Table 2 below.

Further, using the obtained polyamide, a molded article was produced by the method described above and evaluated for the appearance stability and impact resistance properties. Table 2 below shows the evaluation results.

COMPARATIVE EXAMPLE 6

570 g of an equimolar salt of adipic acid and hexamethylenediamine and 930 g of an equimolar salt of isophthalic acid and hexamethylenediamine were used.

Other conditions were carried out in the same manner as in Example 1, whereby a polyamide was obtained.

The polymer properties of the obtained polyamide such as the ratio (x) of the isophthalic acid component, the ratio (EG) of the isophthalic acid end group, and formic acid solution viscosity were measured by the methods described above. The measurement results are shown in Table 2 below.

Further, using the obtained polyamide, a molded article was produced by the method described above and evaluated for the appearance stability and impact resistance properties. Table 2 below shows the evaluation results.

COMPARATIVE EXAMPLE 7

570 g of an equimolar salt of adipic acid and hexamethylenediamine and 930 g of an equimolar salt of isophthalic acid and hexamethylenediamine were used.

0.5% by mol excess of adipic acid with respect to the total equimolar salt component was not added.

Other conditions were carried out in the same manner as in Example 1, whereby a polyamide was obtained.

The polymer properties of the obtained polyamide such as the ratio (x) of the isophthalic acid component, the ratio (EG) of the isophthalic acid end group, and formic acid solution viscosity were measured by the methods described above. The measurement results are shown in Table 2 below.

Further, using the obtained polyamide, a molded article was produced by the method described above and evaluated for the appearance stability and impact resistance properties. Table 2 below shows the evaluation results.

COMPARATIVE EXAMPLE 8

1237 g of an equimolar salt of adipic acid and hexamethylenediamine, 263 g of an equimolar salt of isophthalic acid and hexamethylenediamine and 0.5% by mol excess of adipic acid with respect to the total equimolar salt component were dissolved in 1500 g of distilled water to prepare an equimolar 50% by mass homogeneous aqueous solution of the raw material monomers.

This aqueous solution was charged into an autoclave having an internal volume of 5.4 L, and the autoclave was then subjected to nitrogen substitution.

While the aqueous solution was stirred at a temperature of from 110 to 150° C., water vapor was gradually removed to concentrate the solution to a concentration of 70% by mass.

Subsequently, the internal temperature of the autoclave was increased to 220° C.

At this time, the pressure in the autoclave was increased to 1.8 MPa.

The internal temperature of the autoclave was increased to 260° C. over 1 hour without further treatment and the reaction was allowed to proceed for 1 hour while water vapor was gradually removed to maintain the pressure at 1.8 MPa.

Subsequently, the valve was closed, the heat was turned off and the internal temperature of the autoclave was cooled to room temperature over about 8 hours to obtain a polyamide having a formic acid solution viscosity of 7.

The polymer properties of the obtained polyamide such as the ratio (x) of the isophthalic acid component, the ratio (EG) of the isophthalic acid end group, and formic acid solution viscosity were measured by the methods described above. The measurement results are shown in Table 2 below.

Further, using the obtained polyamide, a molded article was produced by the method described above and evaluated for the appearance stability and impact resistance properties. Table 2 below shows the evaluation results.

COMPARATIVE EXAMPLE 9

The polyamide obtained in the above Comparative Example 3 was supplied to a TEM35 mm biaxial extruder (set temperature: 290° C., screw rotation 300 rpm), a product of TOSHIBA MACHINE CO., LTD., using a feed hopper.

Further, glass fiber (b1) as (B) the inorganic filler was supplied from a side feeder in a ratio of 33% by mass with respect to 67% by mass of the polyamide and the melt kneading was carried out. The melt-kneaded product extruded from a spinning port was cooled in a strand state and pelletized to obtain a pellet polyamide composition.

Further, using the obtained polyamide composition, a molded article was produced by the method described above and evaluated for the appearance stability and impact resistance properties. Table 2 below shows the evaluation results.

TABLE 1

| | | Example 1 | Example 2 | Example 3 | Example 4 | Example 5 | Example 6 |
|---|---|---|---|---|---|---|---|
| Polymer properties | | | | | | | |
| Type and mixing ratio of polyamide | Type | 66/6I | 66/6I | 66/6I | 66/6I | 66/6I | 66/6I |
| | % by mass | 100 | 100 | 100 | 100 | 100 | 100 |
| Ratio (x) of isophthalic acid component to total carboxylic acid | | 0.16 | 0.22 | 0.27 | 0.4 | 0.16 | 0.27 |
| Parameter (Y) | | 0.35 | 0.31 | 0.27 | 0.15 | 0.55 | 0.57 |
| Ratio (EG) of isophthalic acid end group | | 0.45 | 0.46 | 0.47 | 0.49 | 0.62 | 0.68 |
| Amount of isophthalic acid end group (meq/kg) | | 55 | 56 | 58 | 63 | 63 | 67 |
| Amount of adipic acid end group (meq/kg) | | 66 | 66 | 66 | 66 | 38 | 31 |
| Amount of carboxyl end group (meq/kg) | | 121 | 122 | 124 | 129 | 101 | 98 |
| Formic acid solution viscosity | | 27 | 26 | 28 | 28 | 27 | 26 |
| Inorganic filler and mixing ratio thereof | Type | — | — | — | — | — | — |
| | % by mass | — | — | — | — | — | — |
| Polymer physical properties | | | | | | | |
| Appearance stability/gloss value at high cycle molding (high temperature molding, low temperature mold) | 20 Shots | 90 | 90 | 85 | 82 | 85 | 80 |
| | 100 Shots | 89 | 87 | 83 | 79 | 80 | 75 |
| | 20 – 100Δ | 1 | 3 | 2 | 3 | 5 | 5 |
| Charpy impact strength (kJ/m$^2$) | | 9.4 | 8.8 | 8.7 | 8.5 | 9.3 | 8.5 |

| | | Example 7 | Example 8 | Example 9 | Example 10 | Example 11 |
|---|---|---|---|---|---|---|
| Polymer properties | | | | | | |
| Type and mixing ratio of polyamide | Type | 66/6I | 66/6I | 66/6I/6 | 66/6I | 66/6I |
| | % by mass | 100 | 100 | 100 | 67 | 50 |
| Ratio (x) of isophthalic acid component to total carboxylic acid | | 0.23 | 0.22 | 0.23 | 0.16 | 0.16 |
| Parameter (Y) | | 0.36 | 0.37 | 0.30 | 0.35 | 0.35 |

TABLE 1-continued

| | | | | | | |
|---|---|---|---|---|---|---|
| Ratio (EG) of isophthalic acid end group | | 0.51 | 0.51 | 0.46 | 0.45 | 0.45 |
| Amount of isophthalic acid end group (meq/kg) | | 92 | 49 | 56 | 55 | 55 |
| Amount of adipic acid end group (meq/kg) | | 90 | 48 | 66 | 66 | 66 |
| Amount of carboxyl end group (meq/kg) | | 182 | 97 | 122 | 121 | 121 |
| Formic acid solution viscosity | | 16 | 33 | 26 | 27 | 27 |
| Inorganic filler and mixing ratio thereof | Type | — | — | — | b1 | b1 |
| | % by mass | — | — | — | 33 | 50 |
| Polymer physical properties | | | | | | |
| Appearance stability/gloss value at high cycle molding (high temperature molding, low temperature mold) | 20 Shots | 89 | 85 | 75 | 88 | 85 |
| | 100 Shots | 85 | 79 | 68 | 86 | 83 |
| | 20 – 100Δ | 4 | 6 | 7 | 2 | 2 |
| Charpy impact strength (kJ/m$^2$) | | 8.5 | 8.6 | 7.2 | 10.9 | 17.2 |

TABLE 2

| | | Comparative Example 1 | Comparative Example 2 | Comparative Example 3 | Comparative Example 4 | Comparative Example 5 |
|---|---|---|---|---|---|---|
| Polymer properties | | | | | | |
| Type and mixing ratio of polyamide | Type | 66 | 66/6I | 66/6I | 66/6I | 66/6I |
| | % by mass | 100 | 100 | 100 | 100 | 100 |
| Ratio (x) of isophthalic acid component to total carboxylic acid | | 0 | 0.02 | 0.16 | 0.4 | 0.16 |
| Parameter (Y) | | 0 | 0.06 | 0.90 | 0.90 | 0.88 |
| Ratio (EG) of isophthalic acid end group | | 0 | 0.08 | 0.91 | 0.94 | 0.90 |
| Amount of isophthalic acid end group (meq/kg) | | 0 | 10 | 115 | 123 | 114 |
| Amount of adipic acid end group (meq/kg) | | 122 | 110 | 11 | 8 | 13 |
| Amount of carboxyl end group (meq/kg) | | 122 | 120 | 126 | 131 | 127 |
| Formic acid solution viscosity | | 27 | 27 | 28 | 28 | 27 |
| Inorganic filler and mixing ratio thereof | Type | — | — | — | — | — |
| | % by mass | — | — | — | — | — |
| Polymer physical properties | | | | | | |
| Appearance stability/gloss value at high cycle molding (high temperature molding, low temperature mold) | 20 Shots | 20 | 30 | 85 | 78 | 84 |
| | 100 Shots | 8 | 17 | 74 | 67 | 74 |
| | 20 – 100Δ | 12 | 13 | 11 | 11 | 10 |
| Charpy impact strength (kJ/m$^2$) | | 9.6 | 9.0 | 5.3 | 5.1 | 5.1 |

| | | Comparative Example 6 | Comparative Example 7 | Comparative Example 8 | Comparative Example 9 |
|---|---|---|---|---|---|
| Polymer properties | | | | | |
| Type and mixing ratio of polyamide | Type | 66/6I | 66/6I | 66/6I | 66/6I |
| | % by mass | 100 | 100 | 100 | 67 |
| Ratio (x) of isophthalic acid component to total carboxylic acid | | 0.54 | 0.55 | 0.16 | 0.16 |
| Parameter (Y) | | 0.18 | 0.62 | 0.86 | 0.90 |
| Ratio (EG) of isophthalic acid end group | | 0.63 | 0.83 | 0.88 | 0.91 |
| Amount of isophthalic acid end group (meq/kg) | | 75 | 83 | 265 | 115 |
| Amount of adipic acid end group (meq/kg) | | 45 | 17 | 36 | 11 |
| Amount of carboxyl end group (meq/kg) | | 120 | 100 | 301 | 126 |
| Formic acid solution viscosity | | 27 | 27 | 7 | 28 |
| Inorganic filler and mixing ratio thereof | Type | — | — | — | b1 |
| | % by mass | — | — | — | 33 |
| Polymer physical properties | | | | | |
| Appearance stability/gloss value at high cycle molding (high temperature molding, low temperature mold) | 20 Shots | 74 | 75 | Continuous molding was not completed because of mold release problem. | 82 |
| | 100 Shots | 63 | 63 | | 71 |
| | 20 – 100Δ | 11 | 12 | | 11 |
| Charpy impact strength (kJ/m$^2$) | | 5.4 | 5.3 | | 7.2 |

As shown in the above Table 1, the polyamide molded articles of Examples 1 to 11 were all verified to have extremely good appearance stability and impact properties.

On the other hand, the polyamide molded articles of Comparative Examples 3, 4, 5, 8 and 9 with the (Y) being beyond the range of −0.3≤(Y)≤0.8 and the polyamide molded articles of Comparative Examples 1, 2, 6 and 7 with the (x) being beyond the range of 0.05≤(x)≤0.5 were verified to have notably reduced surface appearance stability and impact properties.

This application is based on the Japanese patent application (Patent Application No. 2010-134472), filed on Jun. 11, 2010; and the disclosure of which is incorporated by reference herein.

INDUSTRIAL APPLICABILITY

The polyamide of the present invention can be industrially applicable in the automobile field, electric/electronics field, machinery/industrial field, office equipment field and aerospace field and the like.

The invention claimed is:

1. A polyamide comprising:
   (a) a unit comprising adipic acid and hexamethylenediamine; and
   (b) a unit comprising isophthalic acid and hexamethylenediamine,
   wherein a molar ratio (x) of an isophthalic acid component to a total carboxylic acid component in the polyamide is $0.05 \leq (x) \leq 0.5$ and
   a range of (Y) represented by the following formula (1) is $-0.3 \leq (Y) \leq 0.8$, wherein $$(Y) = [(EG) - (x)]/[1-(x)] \quad (1), \text{ and}$$

wherein (EG) represents a ratio of an isophthalic acid end group to a total carboxyl end group contained in the polyamide and is represented by the following formula (2)

$$(EG) = \text{an amount of the isophthalic acid end group/the total amount of the carboxyl end group} \quad (2), \text{ and}$$

wherein the ratio (x) of the isophthalic acid component, the amount of isophthalic acid end group, and the total amount of carboxyl end group are values determined by a nuclear magnetic resonance method, and the amount of the isophthalic acid end groups and the total amount of carboxyl end groups are measured in units of meg/kg.

2. The polyamide according to claim 1, wherein the range of (Y) represented by the formula (1) is $0.05 \leq (Y) \leq 0.8$.

3. A polyamide composition comprising:
   30 to 95% by mass of the polyamide according to claim 1; and
   5 to 70% by mass of an inorganic filler.

4. A polyamide composition comprising:
   30 to 95% by mass of the polyamide according claim 2; and
   5 to 70% by mass of an inorganic filler.

* * * * *